(12) United States Patent
McCunn et al.

(10) Patent No.: US 6,223,113 B1
(45) Date of Patent: Apr. 24, 2001

(54) DEFAULT MODES OF A TRANSMISSION UTILIZING ELECTRO-HYDRAULIC CLUTCHES

(75) Inventors: Brad K. McCunn, Peoria; Gregory A. Menke, East Peoria; Kevin G. Meyer, Metamora, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/196,823

(22) Filed: Nov. 20, 1998

(51) Int. Cl.[7] .............................. G06F 7/00; G06F 17/00; G06F 19/00
(52) U.S. Cl. .............................. 701/62; 192/357; 361/52; 361/16; 74/335; 74/336 R; 477/43; 477/168
(58) Field of Search .................................. 701/62; 477/43, 477/50, 52, 54, 168, 51, 58, 62, 70; 192/3.57, 56.3, 85, 87.1; 251/129.07; 361/152, 160, 42; 74/335, 336 R, 226 B, 226.5

(56) References Cited

U.S. PATENT DOCUMENTS

| 4,414,863 | 11/1983 | Heino . |
| 4,887,491 | 12/1989 | Holbrook et al. ...................... 74/866 |
| 4,916,983 | 4/1990 | Amrein et al. ........................... 74/878 |
| 4,967,385 | 10/1990 | Brekkestran et al. ........... 364/571.03 |
| 5,053,960 | 10/1991 | Brekkestran et al. ............. 364/424.1 |
| 5,148,722 | 9/1992 | Mehta ..................................... 74/866 |
| 5,251,091 | 10/1993 | Ito et al. . |
| 5,327,320 | * 7/1994 | Fischer ................................... 361/152 |
| 5,438,489 | 8/1995 | Judy et al. . |
| 5,459,658 | 10/1995 | Morey et al. ...................... 364/424.1 |
| 5,493,028 | 2/1996 | Mitchell et al. . |
| 5,493,928 | 2/1996 | Mitchell et al. ......................... 74/335 |
| 5,537,894 | 7/1996 | Chan ...................................... 74/745 |
| 5,608,598 | * 3/1997 | Dieppedalle et al. ................ 361/160 |
| 5,609,067 | 3/1997 | Mitchell et al. ......................... 74/336 |
| 5,682,791 | 11/1997 | Liesener . |

* cited by examiner

Primary Examiner—William A. Cuchlinski, Jr.
Assistant Examiner—Olga Hernandez
(74) Attorney, Agent, or Firm—Kevin M. Kercher; W. Bryan McPherson, III (57) ABSTRACT

In machines having electro-hydraulic transmission controls, it is desirable to ensure that in the event of an electrical malfunction or power failure the transmission responds appropriately. In the subject invention, a system is provided in a transmission which in the event of an individual clutch solenoid fault (short-to-battery, short-to-ground, and open circuit fault) keeps the machine in gear and protects the transmission from damage. A short-to-battery fault will allow shifting to an available gear that utilizes the faulted clutch. If there is a short-to-ground or open circuit fault then the transmission will latch the current gear or shift to a predetermined gear that does not utilize a faulted clutch.

7 Claims, 12 Drawing Sheets

Fig-2

SHORT-TO-GROUND / OPEN CIRCUIT CLUTCH 42A f/t-Fault Present

SHORT-TO-GROUND / OPEN CIRCUIT
CLUTCH 42B f/t - Fault Present

SHORT-TO-GROUND / OPEN CIRCUIT CLUTCH 42C

Fig-11.

SHORT-TO-GROUND / OPEN CIRCUIT
CLUTCH 42D

Fig. 12.

SHORT-TO-GROUND / OPEN CIRCUIT
CLUTCH 42E

DEFAULT MODES OF A TRANSMISSION UTILIZING ELECTRO-HYDRAULIC CLUTCHES

TECHNICAL FIELD

This invention relates generally to a control system for use in a transmission having electro-hydraulically actuated clutches and more particularly to a system to engage specific electro-hydraulically actuated clutches in an event of a fault condition.

BACKGROUND ART

In some machines used today, it is beneficial to keep the transmission in a predetermined gear in the event of an electrical malfunction or power failure. It is known to proportionally control the engagement of hydraulically actuated clutches by directing an electrical signal from a microprocessor to an electro-hydraulic proportional valve. Various other arrangements are known which use hydraulic valves in combination with electrically controlled solenoids to maintain fluid actuators in their engaged position in the event of an electrical system failure. Many of these known arrangements are complicated and use many different components and/or specialized components. It is desirable to provide a system that is simple in construction and effective to maintain a machine in a predetermined gear in the event there is an electrical malfunction or failure in the electrical system.

The present invention is directed to overcoming one or more of the problems as set forth above.

DISCLOSURE OF THE INVENTION

On one aspect of the present invention, in machines having electro-hydraulic transmission controls, it is desirable to ensure that in the event of an electrical malfunction or power failure the transmission responds appropriately. In the subject invention, a system is provided utilizing a transmission, which in the event of a clutch solenoid short-to-battery fault keeps the machine in a gear that utilizes a faulted clutch. If there is a short-to-ground or open circuit clutch solenoid fault then the transmission will attempt to latch the current gear or will shift to a predetermined gear that does not utilize a faulted clutch. In some cases, the selected gear may be neutral to prevent large downshifts.

In another aspect of the present invention, in machines having electro-hydraulic transmission controls, it is desirable to ensure that in the event of an electrical malfunction or power failure the transmission responds appropriately. In the subject invention, a method is provided utilizing a transmission, which in the event of a clutch solenoid short-to-battery fault keeps the machine in a gear that utilizes a faulted clutch. If there is a short-to-ground or open circuit clutch solenoid fault then the transmission will attempt to latch the current gear or will shift to a predetermined gear that does not utilize a faulted clutch. In some cases, the selected gear may be neutral to prevent large downshifts.

BEST MODE FOR CARRYING OUT THE INVENTION

Figure 1:
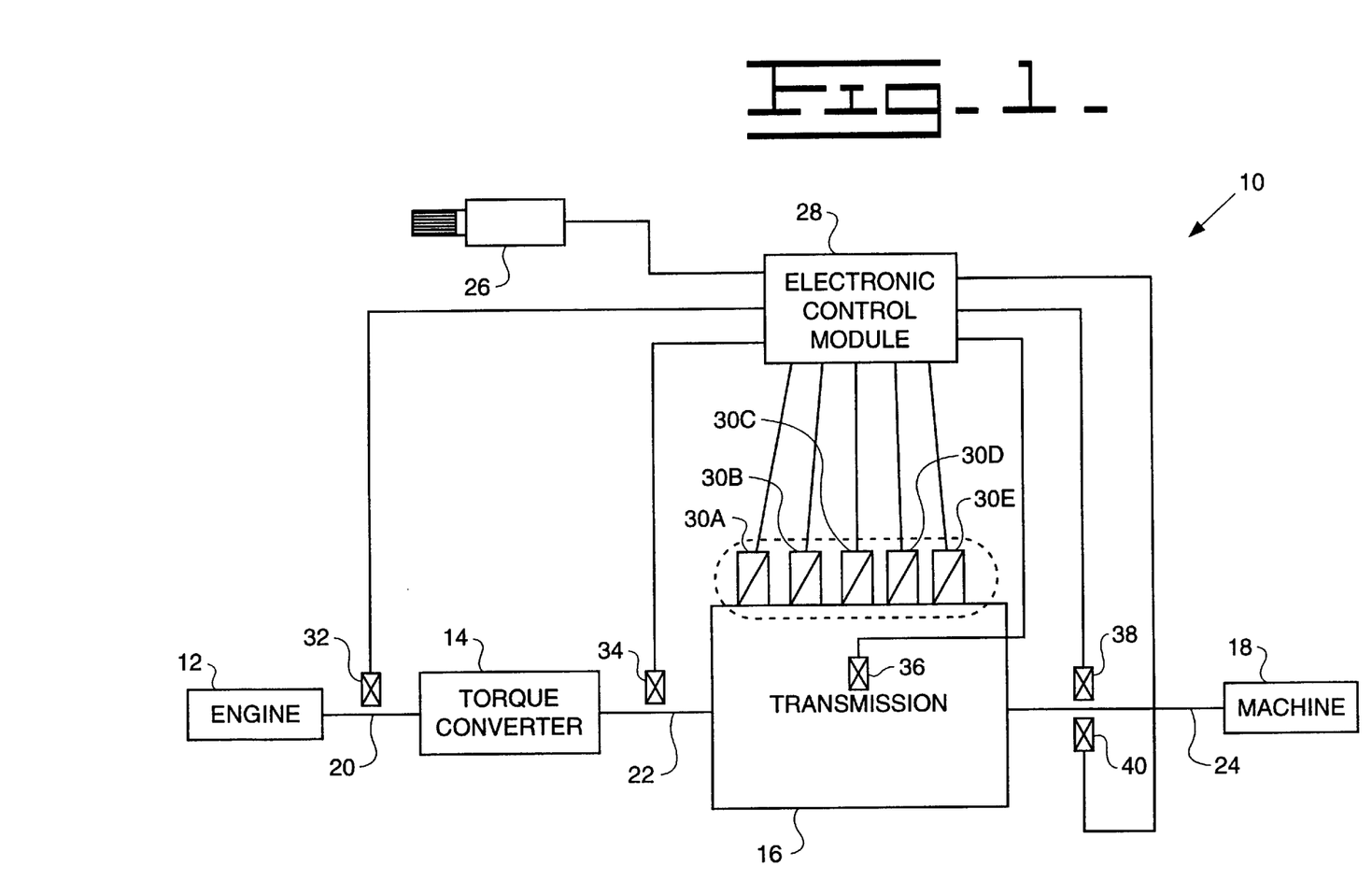
FIG. 1 is a partial diagrammatic and partial schematic representation of a control system for a transmission incorporating an embodiment of the present invention.

Referring now to the drawings, FIG. 1 illustrates an electronic control system of a power train 10 that includes an internal combustion engine 12, a fluidic torque converter 14, a multi-speed fluid operated power transmission 16, and a machine 18. The engine 12 is connected to the torque converter 14 by a first shaft 20, the torque converter 14 is connected to the transmission 16 by a second shaft 22, and the transmission 16 is connected to the machine 18 by a third shaft 24. The shafts 20, 22, and 24 can be eliminated with the combustion engine 12, the fluidic torque converter 14, and the multi-speed fluid operated power transmission 16 being directly connected together.

The control portion of the drivetrain will now be discussed. An operator produces a desired shift by means of an operator shift handle 26 actualized by software in automatic mode based on machine operation. In automatic mode, the software will determine when to upshift or downshift. An electronic control module 28 receives the gear selection signal and then controls the operation of an appropriate one of a plurality of a set of solenoid control valves 30 identified as "A", "B", "C", "D", and "E", respectively. The gear selector is one of the many inputs to the electronic control module which then determines the appropriate gear under the circumstances. The transmission 16 will enter the appropriate gear by selectively controlling solenoid control valves 30A through 30E. The electronic control system also receives various other inputs representing machine system parameters. These other inputs include an engine speed signal from an engine speed sensor 32 and a transmission input signal from a transmission input speed sensor 34. There is also a transmission intermediate speed sensor 36 and a pair of transmission output speed sensors 38 and 40, respectively.

The engine speed sensor 32, transmission input speed sensor 34, transmission intermediate speed sensor 36, and transmission output sensors 38, 40 are conventional electrical transducers, preferably magnetic speed pickups but could include a wide variety of either active and passive speed-type sensing elements such as torque sensors, accelerometers, among others.

The electronic control module 28 delivers a clutch command signal that is proportional to the desired current needed to operate the selected solenoid control valve 30A through 30E. In the preferred embodiment, the current driver utilizes a pulse width modulated voltage to produce the desired current.

Figure 2:
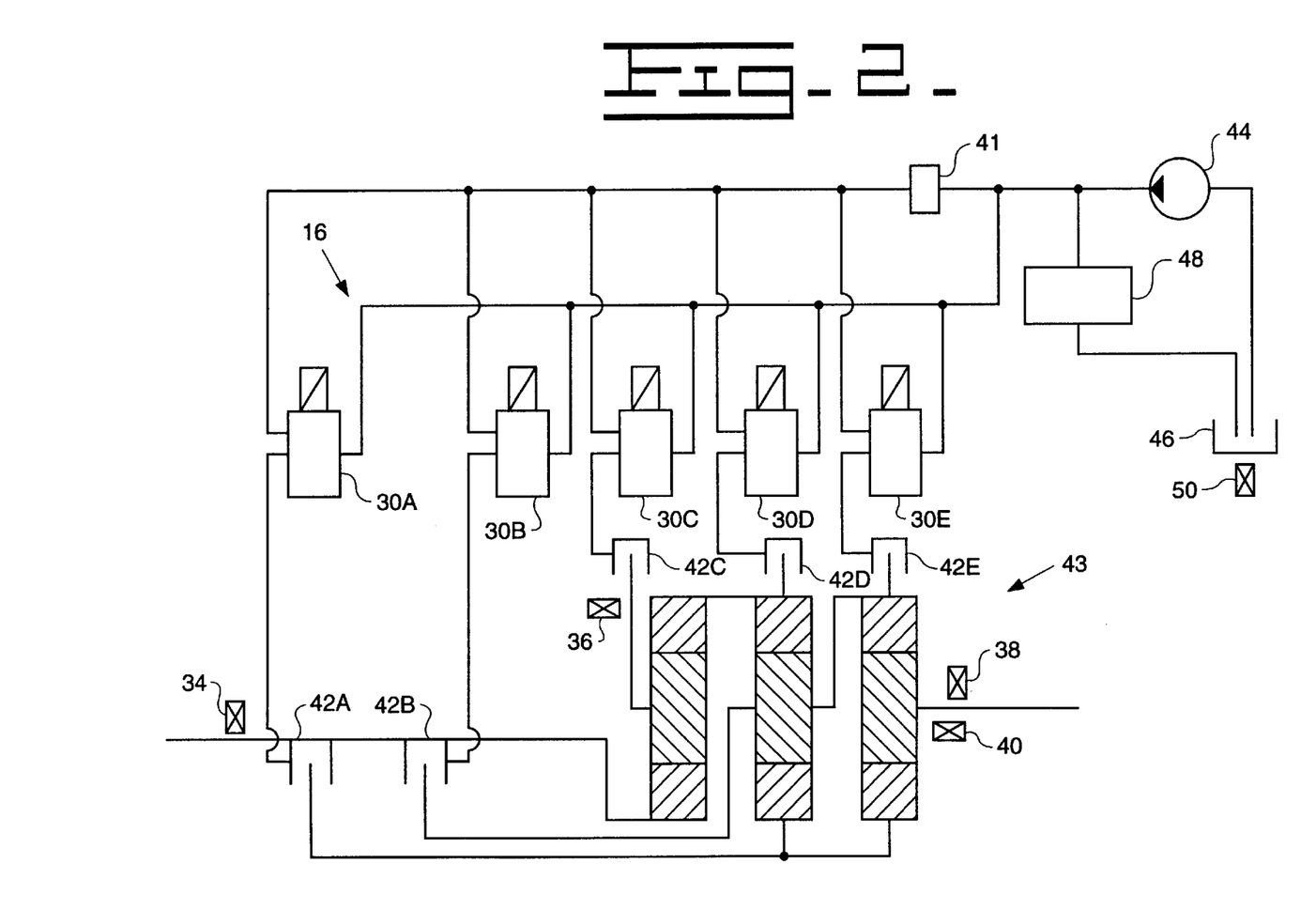
FIG. 2 is a block diagram illustrating an embodiment of a hydraulic system for fluid actuated clutches.

Referring now to FIG. 2, a block diagram of a hydraulic clutch system for the transmission 16 is shown. The solenoid control valves 30A through 30E are configured to maintain a communication of oil to a respective one of a plurality of a set of clutches 42, identified as "A", "B", "C", "D", and "E", respectively, that is sufficient to maintain a clutch pressure that is proportional to the solenoid current. Therefore, the electronic control module 28 controls the clutch pressure by means of a proportional command signal provided to the selected solenoid control valve 30A through 30E.

Gearshifts are accomplished by selectively engaging and disengaging combinations of the clutches. The clutches are actuated by hydraulic pressure and upon engagement, require fill time before torque is transmitted through an engaging clutch. That is, the fill time is the elapsed time that the clutch piston moves from the released to the engaged position. The clutches are selectively engaged and disengaged by the solenoid operated proportional pressure control valves 30A through 30E.

The hydraulic circuit of the transmission includes a positive displacement pump 44 that supplies pressurized hydraulic fluid from the sump or reservoir 46 to the clutches 42A through 42E through the control valves 30A through 30E. Moreover, a relief valve 48 may be added to regulate the valve supply pressure. The electronic control module 28 may also receive a transmission oil temperature signal from a transmission oil temperature sensor 50. There is a latching solenoid 41 that when activated operates to delatch any engaged clutches 30A–30E. The gears in this transmission 16 are generally indicated by numeral 43 in the illustrative, but nonlimiting, configuration of a planetary gear assembly.

The following table illustrates an example of the speed ratios or gears obtainable in the subject transmission 16.

TABLE 1

| GEAR | CLUTCHES ENGAGED |
|---|---|
| N | 42E |
| R | 42C, 42E |
| 1 | 42A, 42E |
| 2 | 42A, 42D |
| 3 | 42A, 42C |
| 4 | 42A, 42B |
| 5 | 42B, 42C |
| 6 | 42B, 42D |

A normal neutral is defined when clutch 42E is the remaining clutch that is engaged, and a wrong clutch neutral is defined when another clutch is engaged 42A–42D.

There are three basic types of electrical failure that can occur with regard to the solenoid control valves 30A through 30E. This includes short to battery, short to ground, and open circuit fault conditions.

The first failure condition to evaluate is when there is a short-to-battery fault associated with the solenoid control valve 30A–30E. When there is a short-to-battery fault for an individual solenoid control valve 30A–30E, the associated faulted clutch 42A–42E will be engaged and not be allowed to disengage, which allows the shifting to an available gear that includes the faulted clutch to prevent three clutches being engaged, which is a condition called "tie-up". The default condition detecting software will now be discussed with reference to FIGS. 3–6 which depict flowcharts representative of the computer program instructions executed by the electronic control module 28 shown in FIG. 1. A programmer skilled in the art could utilize these flowcharts to program any of a wide variety of electronic controllers/computers in a wide variety of programming languages. In the description of the flowcharts, the functional explanation marked with numerals in angle brackets, <nnn>, will refer to the flowchart blocks bearing that number.

Figure 3:
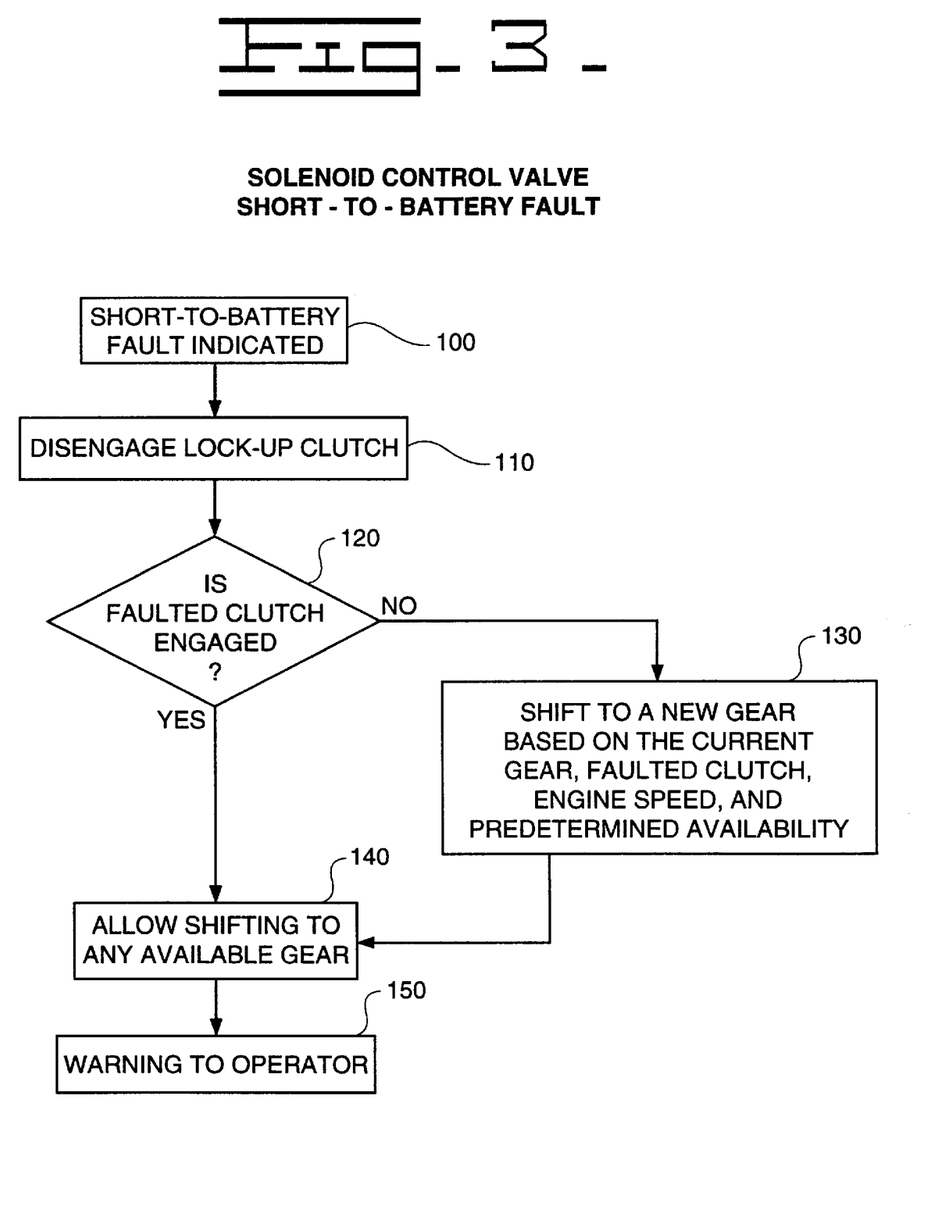
FIG. 3 is a flowchart illustrating software for default modes during a short-to-battery fault affecting a solenoid control valve.

As shown in FIG. 3, the program first determines whether a short-to-battery fault is indicated <100>. The next step is to disengage the lock-up clutch <110>. This is followed by a determination of whether the faulted clutch 42A–42E is engaged <120>. If the answer is negative, the transmission 12 will shift to a new gear utilizing a predetermined availability analysis based on the current gear, the faulted clutch 42A–42E, and the engine speed from the engine speed sensor 32, as shown in FIG. 1 <130>. If the faulted clutch is engaged, then shifting is allowed to any available gear <140>. After the transmission 12 has shifted, a warning is provided to the operator <150>. In some cases, if the transmission 16 output speed is too high to make a downshift, the transmission will go to a neutral state. If the transmission output speed is in an available gear range, the transmission 16 will shift to that gear if that gear includes the faulted clutch.

Once the fault is removed, the electronic control module will wait a few seconds, preferably 2.3 seconds, to resume normal operation and allow the lock-up clutch to engage.

The default gear set for a short to battery fault for a solenoid control valve 30A–30E can be found on the following two tables:

TABLE 2

| FAILURE MODE SHORT TO BATTERY | R | N | GEAR 1 | GEAR 2 |
|---|---|---|---|---|
| Clutch 1 | WCN | WCN | Gear 1 | Gear 2 |
| Clutch 2 | WCN | WCN | Gear 4 | Gear 4 |
| Clutch 3 | Reverse | WCN | Gear 3 | Gear 3 |
| Clutch 4 | WCN | WCN | Gear 2 | Gear 2 |
| Clutch 5 | Reverse | Neutral | Gear 1 | ES < 1324 Gear 1 or Neutral |

TABLE 3

| FAILURE MODE SHORT TO BATTERY | GEAR 3 | GEAR 4 | GEAR 5 | GEAR 6 |
|---|---|---|---|---|
| Clutch 1 | Gear 3 | Gear 4 | ES < 1796 for Gear 4 or WCN | ES < 1521 for Gear 4 or WCN |
| Clutch 2 | Gear 4 | Gear 4 | Gear 5 | Gear 6 |

TABLE 3-continued

| FAILURE MODE SHORT TO BATTERY | GEAR 3 | GEAR 4 | GEAR 5 | GEAR 6 |
|---|---|---|---|---|
| Clutch 3 | Gear 3 | ES < 1634 for Gear 3 or Gear 5 | Gear 5 | ES < 2117 for Gear 3 or WCN |
| Clutch 4 | ES < 1642 for Gear 2 or Gear 6 | Gear 6 | Gear 6 | Gear 6 |
| Clutch 5 | Neutral | Neutral | Neutral | Neutral |

WCN = Wrong Clutch Neutral and
ES = Engine Speed in revolutions per minute

There are other two types of fault conditions regarding the solenoid control valves 30A–30E that include short-to-ground and open circuit conditions. Both of these fault conditions will result in the release of an engaged clutch and a non-engaged clutch will not be allowed to engage. In addition, once a short-to-ground or open circuit fault is detected, the lock-up clutch will be disengaged.

Figure 4:
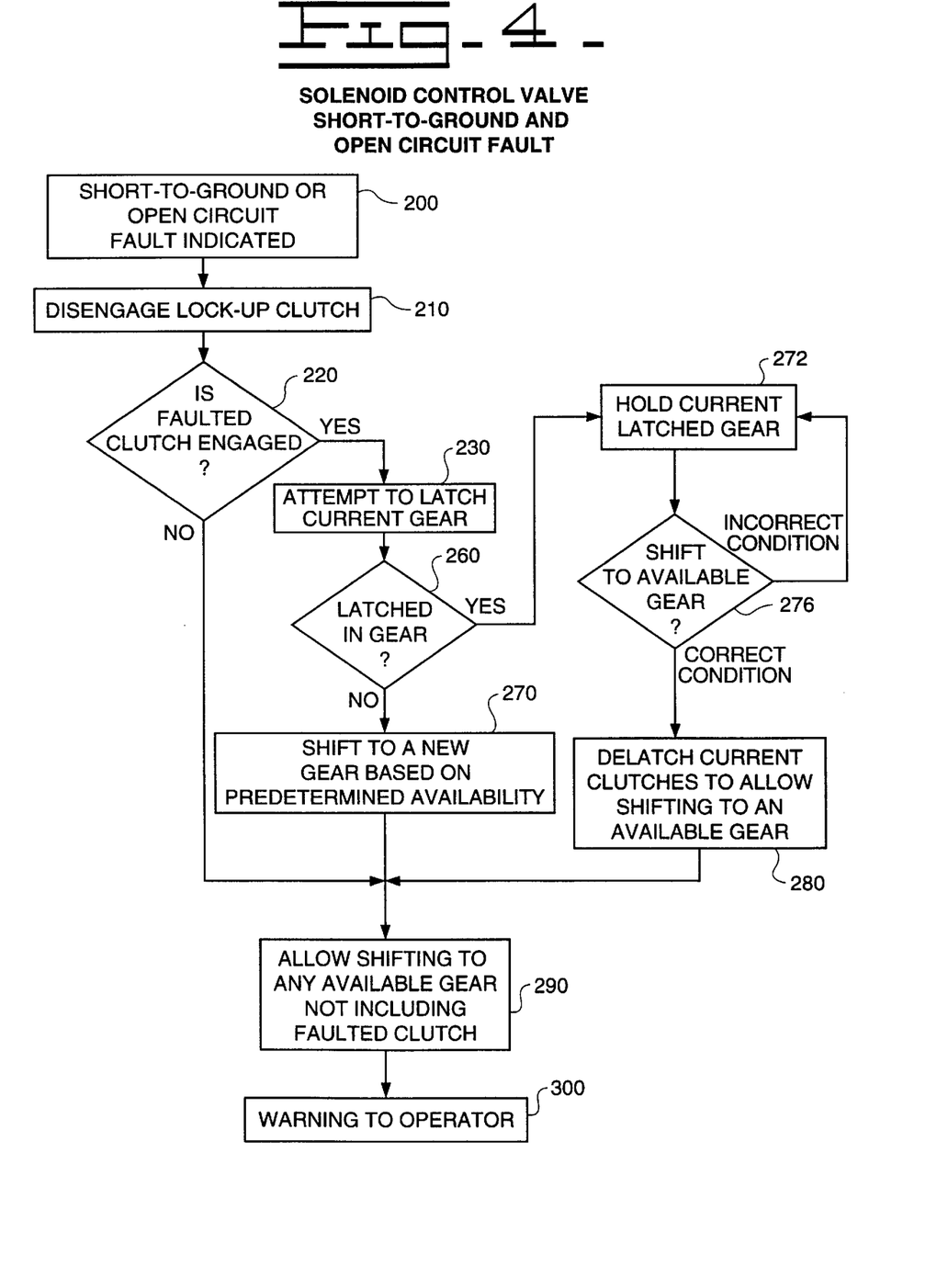
FIG. 4 is a flowchart illustrating software for default modes during a short-to-ground or open circuit fault affecting a solenoid control valve.

As shown in FIG. 4, the program first determines whether a short-to-ground or open circuit fault is present <200>. The next step is to disengage the lock-up clutch <210>. This is followed by a determination of whether the faulted clutch 42A–42E is engaged <220>. If the answer is negative, the transmission 12 will allow shifting to any available gear <290> and then a warning will be provided to the operator <300>.

Figure 5:
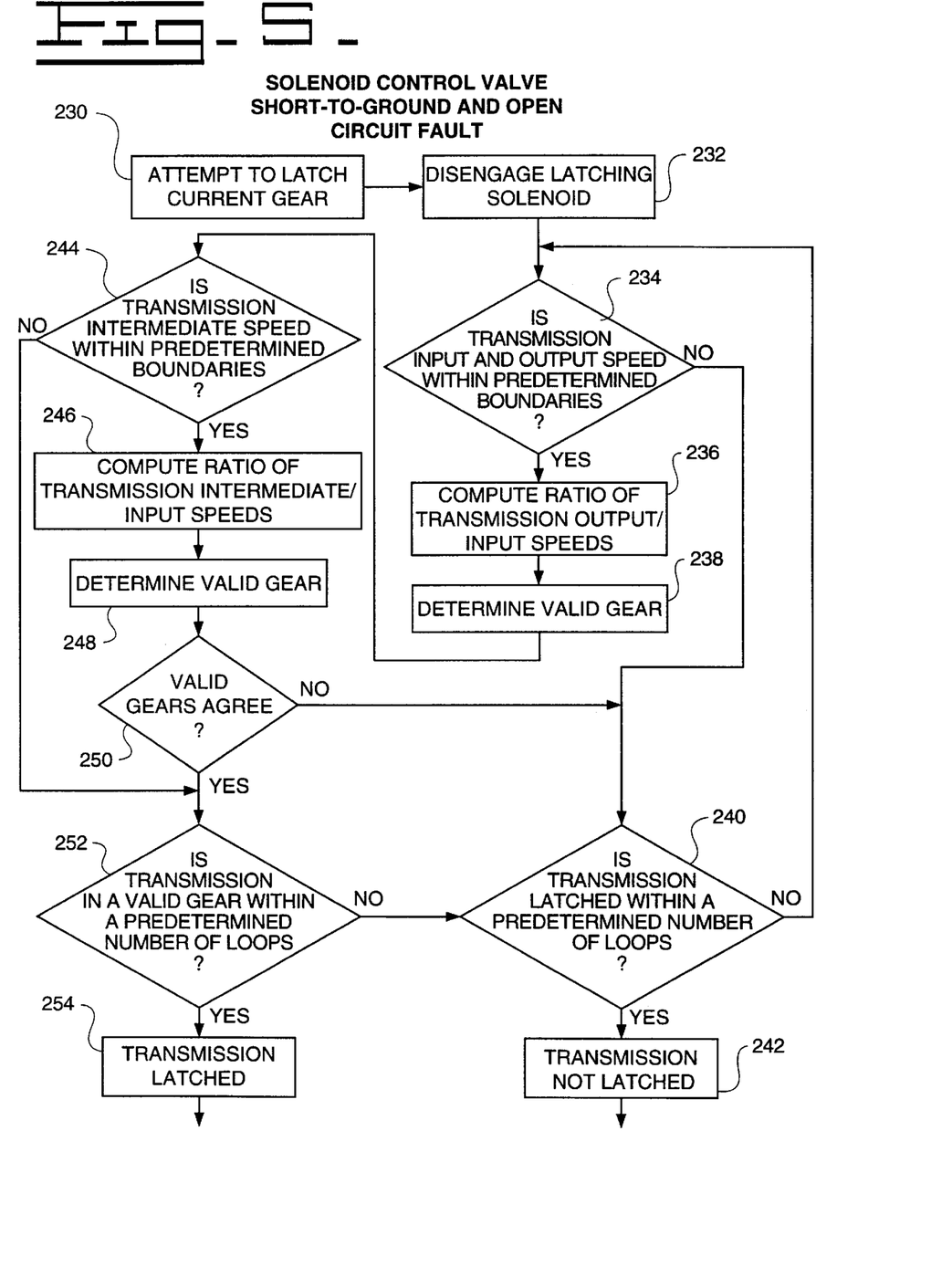
FIG. 5 is a flowchart illustrating a subroutine that forms program step <230>, as shown in FIG. 4.

If the faulted clutch is currently engaged, then there will be an attempt to latch the current gear <230> through a subroutine that is detailed in FIG. 5. A determination is then made to see if the transmission 12 is latched in gear <260>. If the answer is positive, then the transmission 16 will hold the current latched gear <272>. The transmission will attempt to shift to an available gear <276> if conditions are correct. The electronic control module 28 will delatch currently engaged clutches to allow shifting to an available gear <280>. If conditions are incorrect, the current gear will remain latched <272>. Once the transmission 12 has shifted to an available gear <280>, then shifting is allowed to any other available gear with this range that does not include the faulted clutch <290> and a warning is provided to the operator <300>.

If the determination to see if the transmission 12 is latched in gear <260> is negative, shifting to a new gear based on predetermined availability will occur <270>. Once the transmission 12 has shifted to this new gear, then the transmission 12 will allow shifting to any other available gear <290>. Once again, a warning will be provided to the operator <300>.

The subroutine that details the step of attempting to latch the current gear <230> is shown in FIG. 5. The first step is to disengage the latching solenoid 41 <232>. The transmission input speed and transmission output speed are then analyzed to determine if they fall within predetermined boundaries <234>. These predetermined boundaries depend on the type of machine 18 and associated transmission 16. If transmission input speed and transmission output speed fail to fall between the prescribed predetermined boundaries, the program will keep looping a predetermined number of loops <240>, preferably 75 loops depending on the machine. If the predetermined number of loops is completed and the transmission input speed and transmission output speed are still not within the predetermined boundaries, the electronic control module 28 will determine that the transmission 16 is not latched <242>.

If the transmission input and transmission output speeds fall with the predetermined boundaries <234>, then a computation of the ratio of the transmission output speed divided by the transmission input speed is calculated <236> and then a determination of a valid gear is made <238>. The next step is a determination if the transmission intermediate speed is within predetermined boundaries <244>. If the response is negative and the transmission 16 is not within a valid gear within a predetermined number of loops <252>, then the program will return to the previously described loop involving step <234> that determines whether or not the transmission input speed and transmission output speed are within predetermined boundaries and attempts to latch within a predetermined number of loops <240>.

However, if the transmission intermediate speed is within the predetermined boundaries <244>, then a computation of the ratio of the transmission intermediate speed divided by the transmission input speed is developed <246> and a determination of a valid gear is made based on this information <248>. If the previous determination of a valid gear made in step <238> agrees with this determination <248> as shown in step <250>, then the transmission 16 will attempt to latch into gear within a predetermined number of loops <252> and if positive will latch the transmission 16 in gear <254>. If the response is negative and the determination of the valid gear in steps <250> and <238>, respectively do not agree, then the program will return to the previously described loop involving step <234> that determines whether or not the transmission input speed and transmission output speed are within predetermined boundaries and an attempt to latch within a predetermined number of loops will occur <240>.

Figure 6:
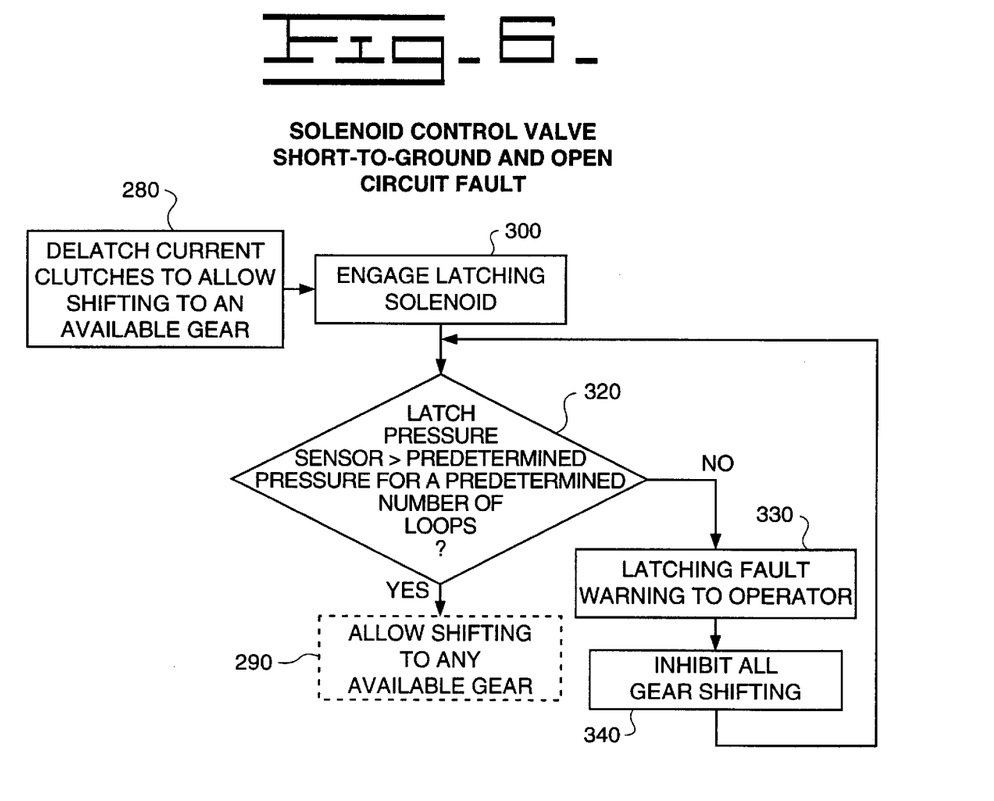
FIG. 6 is a flowchart illustrating a subroutine that forms program step <280>, as shown in FIG.4.

The subroutine associated with the step to delatch current clutches to allow shifting to an available gear <280> detailed in FIG. 4 is shown in FIG. 6. The first step is to engage the latching solenoid 41 <300>. If the latch pressure is over a predetermined value, preferably 200 pounds per square inch for a predetermined number of loops <320>, shifting is allowed to any available gear <290>. Step <290> is also shown in FIG. 4. If the latch pressure is not over a predetermined value for a predetermined number of loops, then a latching fault warning is provided to the operator <330> and all gear shifting is inhibited <340>. The program will than loop through step <320> until the latch pressure is higher than the predetermined value.

Figure 7:
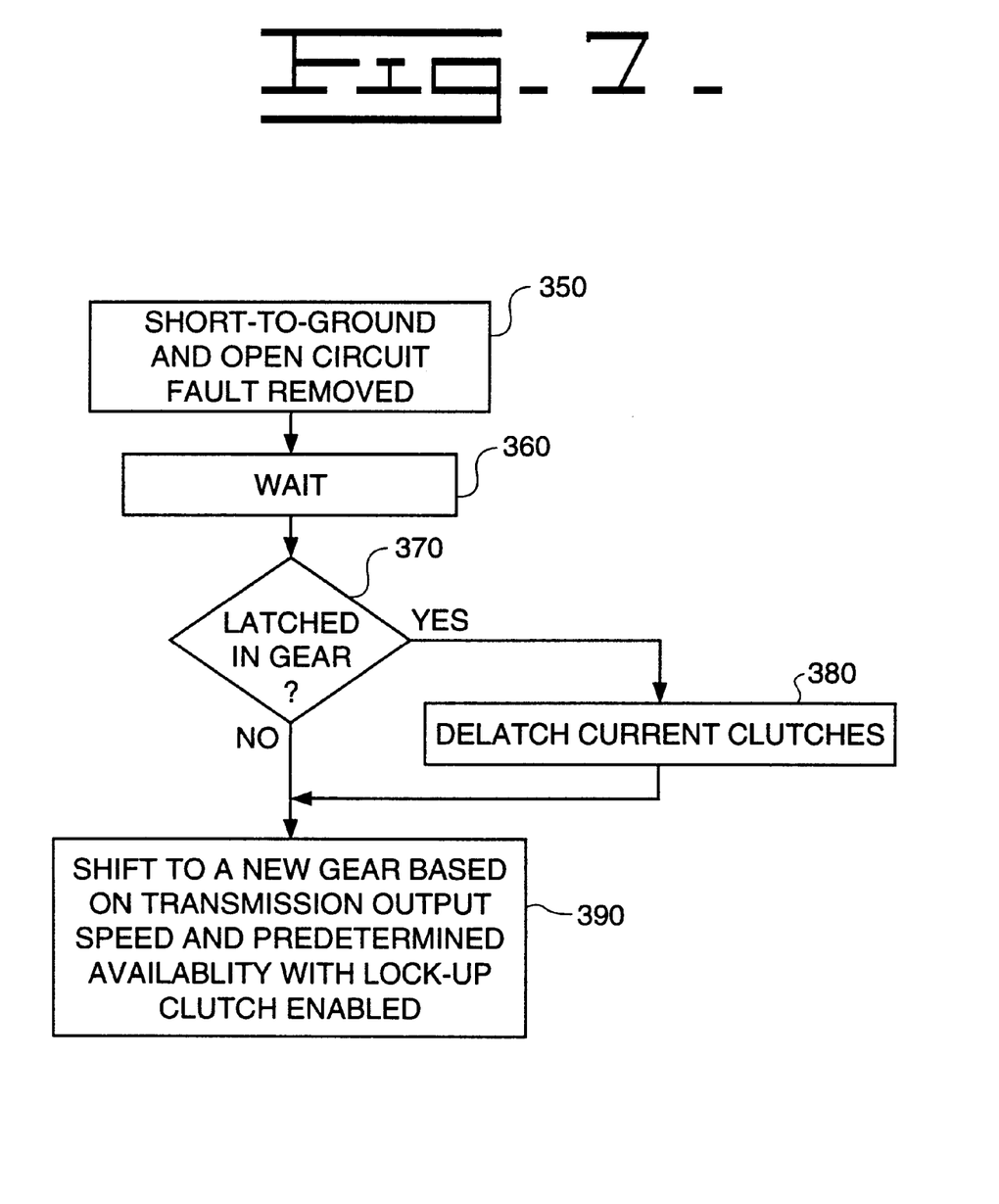
FIG. 7 is a flowchart illustrating software for operating conditions during a removal of a short-to-ground or open circuit fault affecting a solenoid control valve.

Referring now to FIG. 7, when the open circuit or short-to-ground fault is removed <350>, a predetermined waiting period occurs <360>, preferably 2.3 seconds depending on machine type and associated transmission 16. A determination is then made as to whether the transmission 16 is latched in gear <370>. If the answer is yes, the current clutches are delatched <380> and then there is a shift to a new gear based on the transmission output speed and the predetermined availability with the lock-up clutch enabled <390>. If the answer is no, then the program goes directly to the step of shifting to a new gear based on transmission output speed and predetermined availability with the lock-up clutch enabled <390>.

Figure 8:
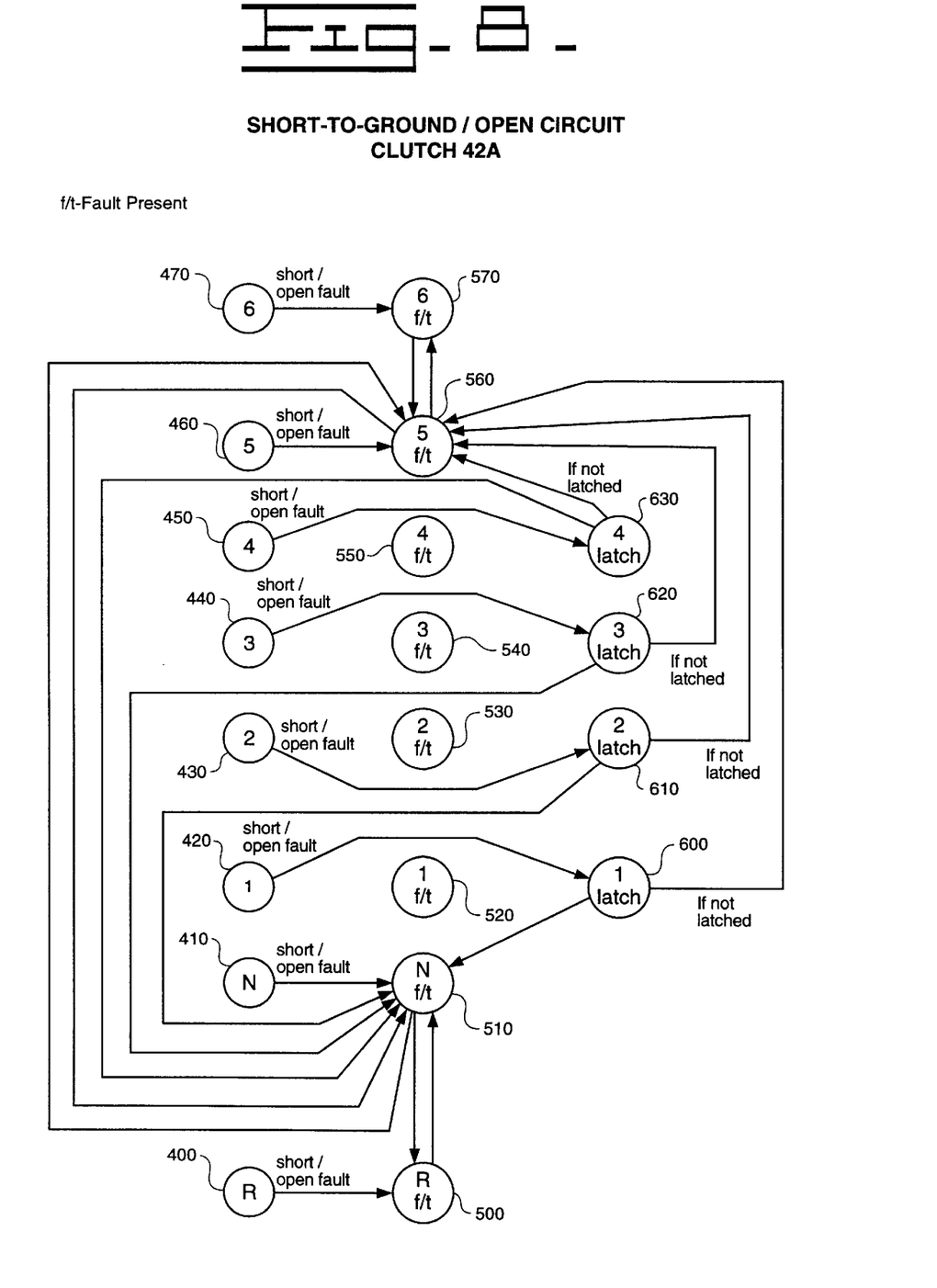
FIG. 8 is a state diagram illustrating appropriate gear engagement during a short-to-ground or open circuit fault affecting a solenoid control valve 30A that controls clutch 42A.
Figure 9:
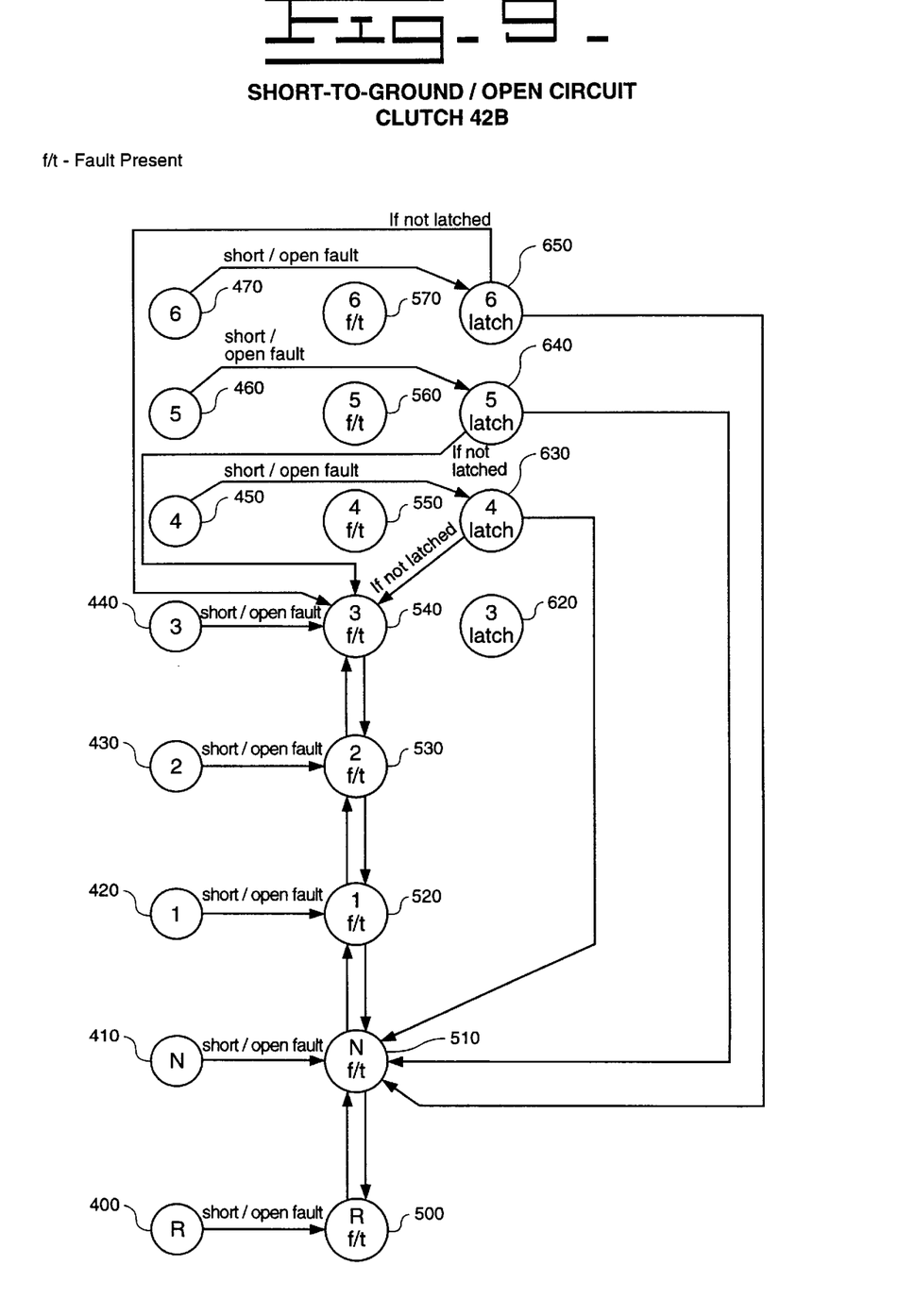
FIG. 9 is a state diagram illustrating appropriate gear engagement during a short-to-ground or open circuit fault affecting a solenoid control valve 30B that controls clutch 42B.
Figure 10:
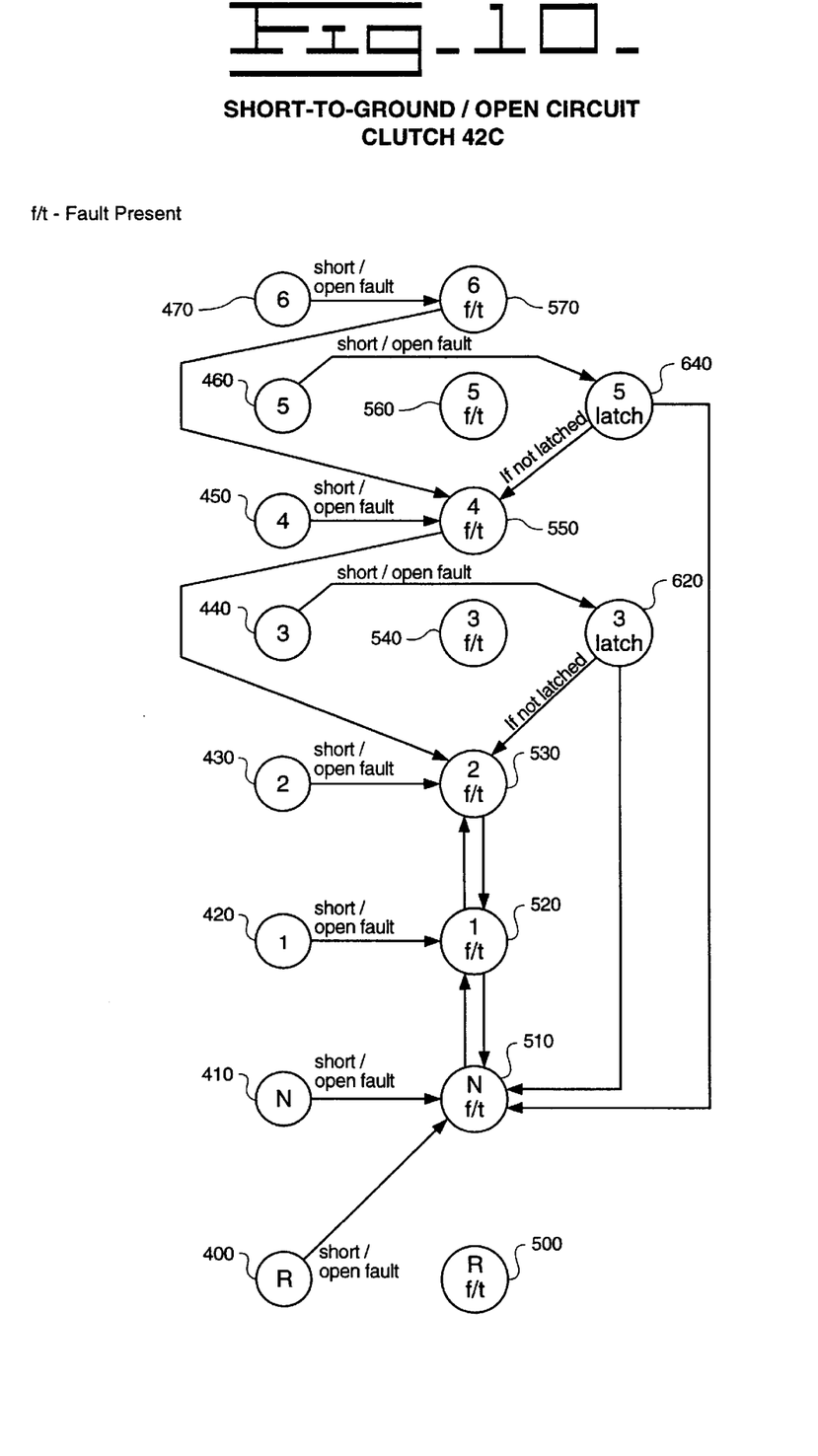
FIG. 10 is a state diagram illustrating appropriate gear engagement during a short-to-ground or open circuit fault affecting a solenoid control valve 30C that controls clutch 42C.
Figure 11:
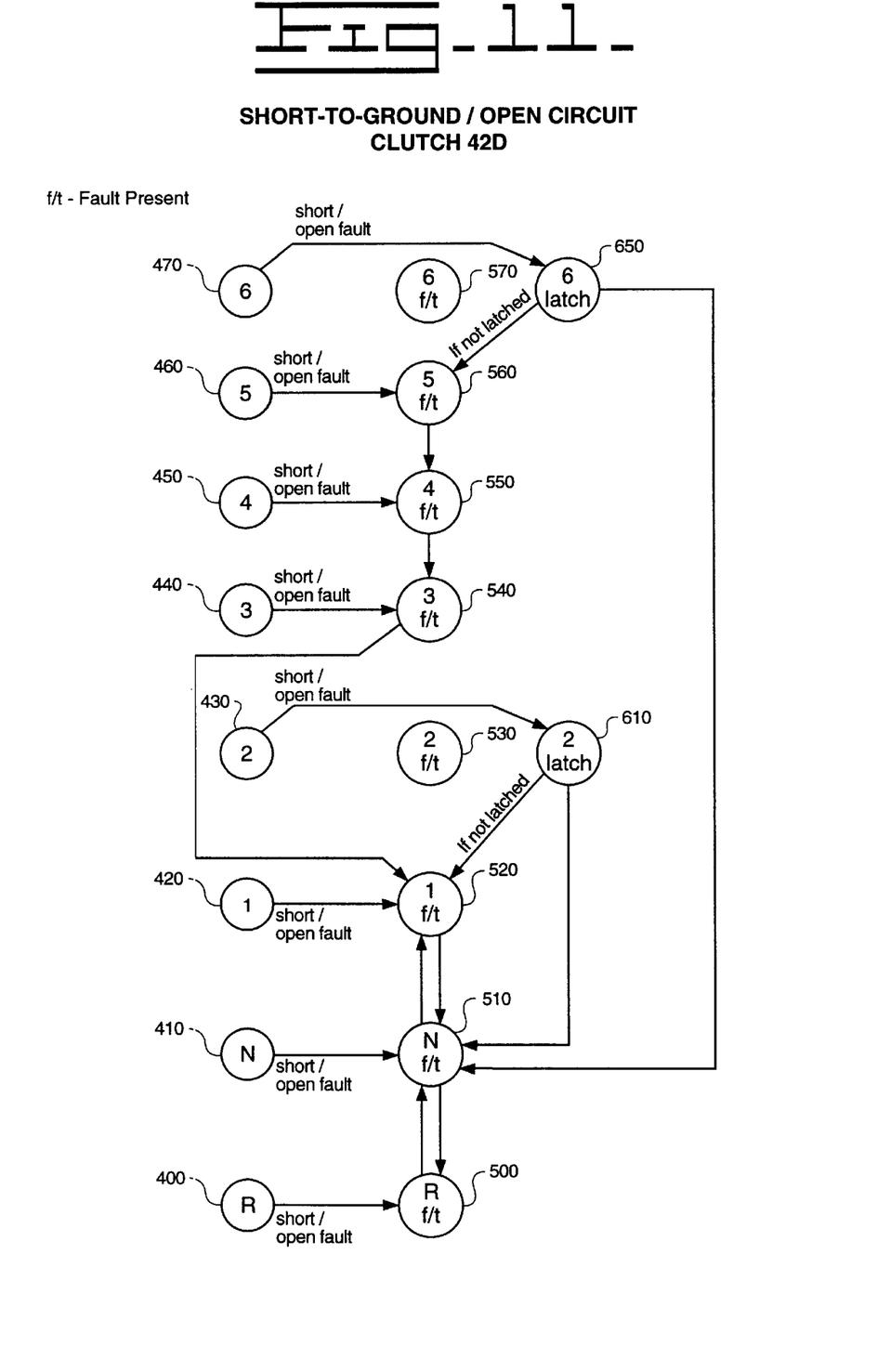
FIG. 11 is a state diagram illustrating appropriate gear engagement during a short-to-ground or open circuit fault affecting a solenoid control valve 30D that controls clutch 42D.
Figure 12:
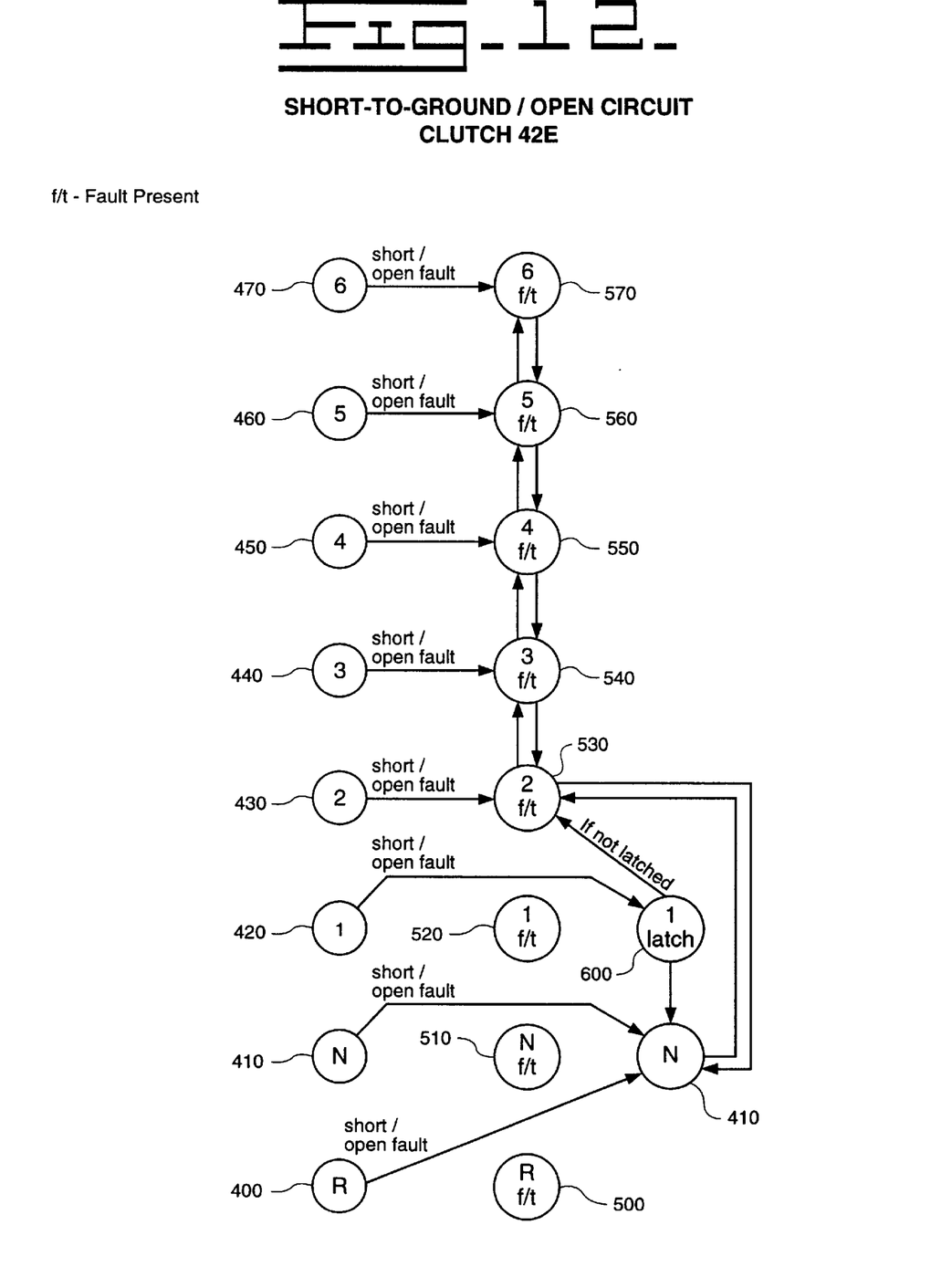
FIG. 12 is a state diagram illustrating appropriate gear engagement during a short-to-ground or open circuit fault affecting a solenoid control valve 30E that controls clutch 42E.

FIGS. 8–12 are state diagrams representing the condition when there is either a short-to-ground or open circuit fault with regard to the solenoids 30A–30E associated with clutches 42A–42E, respectively. The state diagram includes the actual gears including reverse 400, neutral 410, first gear 420, second gear 430, third gear 440, fourth gear 450, fifth gear 460, and sixth gear 470. When a short-to-ground or open circuit fault occurs, the diagrams illustrate how the machine 18 will either go into a latched or fault state for that particular gear. The state diagrams also include gears with a fault present including reverse 500, neutral 510, first gear 520, second gear 530, third gear 540, fourth gear 550, fifth gear 560, and sixth gear 570. The state diagrams also include gears that are latched including first gear 600, second gear 610, third gear 620, fourth gear 630, fifth gear 640, and sixth gear 650. FIG. 8 is the state diagram associated with short-to-ground or open circuit fault associated with solenoid 30A that affects clutch 42A. FIG. 9 is the state diagram associated with short-to-ground or open circuit fault associated with solenoid 30B that affects clutch 42B. FIG. 10 is the state diagram associated with short-to-ground or open circuit fault associated with solenoid 30C that affects clutch 42C. FIG. 11 is the state diagram associated with short-to-ground or open circuit fault associated with solenoid 30D that affects clutch 42D. FIG. 12 is the state diagram associated with short-to-ground or open circuit fault associated with solenoid 30E that affects clutch 42E. Upon either a short-to-ground or open circuit fault, the transmission 16 will either latch the current gear or shift to a predetermined gear or stay in the current gear without latching. These state diagrams, FIGS. 8–12 will be different for each transmission configuration.

The default gear set for a short-to-ground or open circuit fault for a solenoid control valve 30A–30E can be found on the following two tables:

TABLE 4

| FAILURE MODE SHORT TO GROUND OR OPEN CIRCUIT | R | N | GEAR 1 | GEAR 2 |
|---|---|---|---|---|
| Clutch 1 | Reverse | Neutral | Latch Gear 5 | Latch Gear 5 |
| Clutch 2 | Reverse | Neutral | Gear 1 | Gear 2 |
| Clutch 3 | Neutral | Neutral | Gear 1 | Gear 2 |
| Clutch 4 | Reverse | Neutral | Gear 1 | Latch ES < 1324 Gear 1 or Gear 3 |
| Clutch 5 | N | N | Latch Gear 2 | Gear 2 |

TABLE 5

| FAILURE MODE SHORT TO GROUND OR OPEN CIRCUIT | GEAR 3 | GEAR 4 | GEAR 5 | GEAR 6 |
|---|---|---|---|---|
| Clutch 1 | Latch Gear 5 | Latch Gear 5 | Gear 5 | Gear 6 |
| Clutch 2 | Gear 3 | Latch ES < 1642 for Gear 2 or Gear 4 | Latch ES < 1174 for Gear 3 or Neutral | Latch ES < 994 for Gear 3 or Neutral |
| Clutch 3 | Latch ES < 1642 for Gear 2 or Gear 4 | Gear 4 | Latch ES < 1796 for Gear 4 or Gear 6 | Gear 6 |

TABLE 5-continued

| FAILURE MODE SHORT TO GROUND OR OPEN CIRCUIT | GEAR 3 | GEAR 4 | GEAR 5 | GEAR 6 |
|---|---|---|---|---|
| Clutch 4 | Gear 3 | Gear 4 | Gear 5 | Latch ES < 2117 for Gear 5 or Neutral |
| Clutch 5 | Gear 3 | Gear 4 | Gear 5 | Gear 6 |

N = Neutral and ES = Engine Speed

Industrial Applicability

The present invention is advantageously applicable in controlling the shifting of a clutch utilized in conjunction with a torque converter, typically, but not limited to, construction machines such as motor graders, off-highway trucks, wheel loaders, bulldozers, and the like. The following description is only for the purposes of illustration and is not intended to limit the present invention as such. It will be recognizable, by those skilled in the art, that the present invention is suitable for a plurality of other applications.

If there is a short-to-battery fault for the solenoid control valves 30A–30E that is directly engaged to a corresponding clutch 42A–42E, then the lock-up clutch is disengaged and the transmission 16 will allow shifting to a gear based on predetermined availability. If there is a short-to-battery fault for the solenoid control valves 30A–30E that is not directly engaged to a corresponding clutch 42A–42E, then the lock-up clutch is disengaged and the electronic control module 28 will shift the transmission 16 based on the current gear, faulted clutch, and engine speed.

If there is a short-to-ground or open circuit fault for the solenoid control valves 30A–30E that is directly engaged to a corresponding clutch 42A–42E, then the lock-up clutch is disengaged and the transmission 16 will attempt to latch the current gear unless in reverse or neutral. If there is a short-to-ground or open circuit fault for the solenoid control valves 30A–30E that is not directly engaged to a corresponding clutch 42A–42E, then the lock-up clutch is disengaged and any gear that utilizes a faulted clutch 42A–42E is unavailable. If the electronic control module 28 determines that the transmission has not latched into gear the electronic control module 28 will shift to a new gear based on the current gear, clutch faulted, and engine speed. The transmission 16 will allow shifting to gears that do not include the faulted clutch 42A–42E. If the transmission 16 is latched into gear, then shifting is enabled to any available gear and if the transmission output speed and a new gear is available, the shifting is allowed as long as the electronic control module 28 delatches the currently latched clutches 42A–42E.

In view of the foregoing, it is readily apparent that the subject default modes of a transmission of a transmission utilizing electo-hydraulic clutches selectively provides a high quality means of controlling the engagement of a plurality of fluid actuated clutches in a fault condition.

Other aspects, objects and advantages of the invention can be obtained from a study of the drawings, the disclosure and the appended claims.

What is claimed is:

1. A system for detecting default conditions for a plurality of fluid actuated clutches associated with a transmission having a plurality of gears comprising:
   a plurality of fluid actuated clutches each of which is operatively connected in a one-to-one correspondence to a plurality of control valves;

at least one input mechanism that generates a signal indicating a short-to-battery fault condition for at least one of said plurality of control valves and a value for speed of an engine drive; and an electronic controller for detecting said signal indicating a short-to-battery fault condition for at least one of said plurality of control valves and shifting to a predetermined gear that is utilized by of said fluid actuated clutches that are in one-to-one correspondence with said at least one of said plurality of control valves having said short-to-battery fault condition, wherein said predetermined gear is based on a current gear, said speed of an engine drive, and said least one of said plurality of clutches having said short-to-battery condition.

2. A system for detecting default conditions for a plurality of fluid actuated clutches associated with a transmission having a plurality of gears comprising:

a plurality of fluid actuated clutches each of which is operatively connected in a one-to-one correspondence to a plurality of control valves;

at least one input mechanism that generates a signal indicating a short circuit-to-ground fault condition for at least one of said plurality of control valves and a signal indicating a speed of an engine drive; and an electronic controller for detecting said signal indicating a short circuit-to-ground fault condition for at least one of said plurality of control valves and disengaging said fluid actuated clutches that are in one-to-one correspondence, and shifting to a predetermined gear that is not utilized by at least one of said plurality of clutches in one-to-one correspondence with said at least one of said plurality of control valves having said short circuit-to-ground fault condition, wherein said predetermined gear is based on a current gear, said speed of an engine drive, and said least one of said plurality of clutches having said short circuit-to-ground condition.

3. The system of claim 2, wherein said input mechanism also generates a signal, including a value for speed of an engine drive, wherein said transmission will allow shifting to a predetermined gear that is not utilized by at least one of said plurality of clutches in one-to-one correspondence with said at least one of said plurality of control valves having said short circuit-to-ground fault condition wherein said predetermined gear is based on a current gear, said speed of an engine drive, and said least one of said plurality of clutches having said short circuit-to-ground condition.

4. A system for detecting default conditions for a plurality of fluid actuated clutches associated with a transmission having a plurality of gears comprising:

a plurality of fluid actuated clutches each of which is operatively connected in a one-to-one correspondence to a plurality of control valves;

at least one input mechanism that generates a signal indicating an open circuit fault condition for at least one of said plurality of control valves and a signal indicating a speed of an engine drive; and an electronic controller for detecting said signal indicating an open circuit fault condition for at least one of said plurality of control valves and disengaging said fluid actuated clutches that are in one-to-one correspondence, and shifting to a predetermined gear that is not utilized by at least one of said plurality of clutches in one-to-one correspondence with said at least one of said plurality of control valves having said open circuit fault condition wherein said predetermined gear is based on a current gear, said speed of an engine drive, and said least one of said plurality of clutches having said open circuit condition.

5. A process for detecting default conditions for a plurality of fluid actuated clutches each of which is operatively connected in a one-to-one correspondence to a plurality of control valves associated with a transmission having a plurality of gears comprising the steps of:

generating a signal indicating a short-to-battery fault condition for at least one of said plurality of control valves;

generating a signal, including a value for speed of an engine drive;

detecting said short-to-battery fault condition signal for at least one of said plurality of control valves with an electronic controller;

maintaining engagement of said fluid actuated clutches, with said electronic controller, that are in one-to-one correspondence with said plurality of control valves having said short-to-battery fault condition; and shifting to a predetermined gear that is utilized by at least one of said plurality of clutches in one-to-one correspondence with at least one of said plurality of control valves having said short-to-battery fault condition, wherein said predetermined gear is based on a current gear, said speed of an engine drive, and said least one of said plurality of clutches having said short-to-battery fault condition.

6. A process for detecting default conditions for a plurality of fluid actuated clutches each of which is operatively connected in a one-to-one correspondence to a plurality of control valves associated with a transmission having a plurality of gears comprising the steps of:

generating a signal indicating a short circuit-to-ground fault condition for at least one of said plurality of control valves;

generating a signal, including a value for speed of an engine drive;

detecting said short circuit-to-ground fault condition signal for at least one of said plurality of control valves with an electronic controller;

disengaging said fluid actuated clutches, with said electronic controller, that are in one-to-one correspondence with said plurality of control valves having said short circuit-to-ground fault condition; and shifting to a predetermined gear that is not utilized by at least one of said plurality of clutches in one-to-one correspondence with at least one of said plurality of control valves having said short circuit-to-ground fault condition.

7. A process for detecting default conditions for a plurality of fluid actuated clutches each of which is operatively connected in a one-to-one correspondence to a plurality of control valves associated with a transmission having a plurality of gears comprising the steps of:

generating a signal indicating an open circuit condition for at least one of said plurality of control valves;

generating a signal, including a value for speed of an engine drive;

detecting said open circuit fault condition signal for at least one of said plurality of control valves with an electronic controller;

disengaging said fluid actuated clutches, with said electronic controller, that are in one-to-one correspondence with said plurality of control valves having said open circuit fault condition; and shifting to a predetermined gear that is not utilized by at least one of said plurality of clutches in one-to-one correspondence with at least one of said plurality of control valves having said open circuit fault condition.

* * * * *